(12) United States Patent
Xie

(10) Patent No.: US 10,384,949 B1
(45) Date of Patent: Aug. 20, 2019

(54) SYNTHESIS OF MOLECULAR SIEVE SSZ-43

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 27 days.

(21) Appl. No.: 15/950,232

(22) Filed: Apr. 11, 2018

(51) Int. Cl.
*C01B 39/48* (2006.01)
*B01J 29/70* (2006.01)

(52) U.S. Cl.
CPC ............. *C01B 39/48* (2013.01); *B01J 29/70* (2013.01)

(58) Field of Classification Search
CPC .................................. C01B 39/48; B01J 29/70
See application file for complete search history.

(56) References Cited

U.S. PATENT DOCUMENTS

| | | | | |
|---|---|---|---|---|
| 5,965,104 A | * | 10/1999 | Lee | C01B 37/02 208/111.01 |
| 6,468,501 B1 | * | 10/2002 | Chen | C01B 39/026 423/713 |
| 10,213,771 B2 | * | 2/2019 | Yang | B01J 29/86 |
| 2017/0128924 A1 | * | 5/2017 | Yang | B01J 29/86 |

OTHER PUBLICATIONS

J.G. Nery, S-J. Hwang and M.E. Davis "On the synthesis of SSZ-48, SSZ-43 and their variations" Micropor. Mesopor. Mater. 2002, 52, 19-28.

* cited by examiner

*Primary Examiner* — David M Brunsman
(74) *Attorney, Agent, or Firm* — Terrence M. Flaherty

(57) ABSTRACT

A molecular sieve having the framework structure of SSZ-43 is produced using one or more of 3,3'-(butane-1,4-diyl)bis(1-methyl-2-propyl-1H-imidazol-3-ium) dications and N,N'-(1,4-phenylenebis(methylene))bis(N,N-diethylethaniminium) dications as a structure directing agent.

12 Claims, 3 Drawing Sheets

SYNTHESIS OF MOLECULAR SIEVE SSZ-43

TECHNICAL FIELD

This disclosure relates to the synthesis of molecular sieve SSZ-43.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

The composition and characterizing X-ray diffraction pattern of molecular sieve SSZ-43 are disclosed in U.S. Pat. No. 5,965,104, which also describes the preparation of the molecular sieve using a substituted piperidinium or decahydroquinolinium cation as a structure directing agent.

According to the present disclosure, it has now been found the cations described herein are effective as structure directing agents in the synthesis of SSZ-43.

SUMMARY

In one aspect, there is provided a method of synthesizing a molecular sieve having the structure of SSZ-43, the method comprising: (a) providing a reaction mixture comprising: (1) a source of silicon oxide; (2) a source of an oxide of a trivalent element (X); (3) a source of a Group 1 or Group 2 metal (M); (4) a structure directing agent (Q) comprising one or more of 3,3'-(butane-1,4-diyl)bis(1-methyl-2-propyl-1H-imidazol-3-ium) dications and N,N'-(1,4-phenylenebis(methylene))bis(N,N-diethylethaniminium) dications; (5) a source of hydroxide ions; and (6) water; and (b) subjecting the reaction mixture to crystallization conditions sufficient to form crystals of the molecular sieve.

In another aspect, there is provided a molecular sieve having the structure of SSZ-43 and, in its as-synthesized form, comprising one or more of 3,3'-(butane-1,4-diyl)bis(1-methyl-2-propyl-1H-imidazol-3-ium) dications and N,N'-(1,4-phenylenebis(methylene))bis(N,N-diethylethaniminium) dications in its pores.

The molecular sieve has, in its as-synthesized and anhydrous form, a chemical composition comprising the following molar relationship:

|  | Broad | Exemplary |
| --- | --- | --- |
| $SiO_2/X_2O_3$ | ≥30 | 50 to 200 |
| $Q/SiO_2$ | >0 to 0.1 | >0 to 0.1 |
| $M/SiO_2$ | >0 to 0.1 | >0 to 0.1 | wherein X is a trivalent element (e.g., one or more of boron, aluminum, gallium, and iron); Q comprises one or more of 3,3'-(butane-1,4-diyl)bis(1-methyl-2-propyl-1H-imidazol-3-ium) dications and N,N'-(1,4-phenylenebis(methylene))bis(N,N-diethylethaniminium) dications; and M is a Group 1 or Group 2 metal.

DETAILED DESCRIPTION

Introduction

Figure 1:
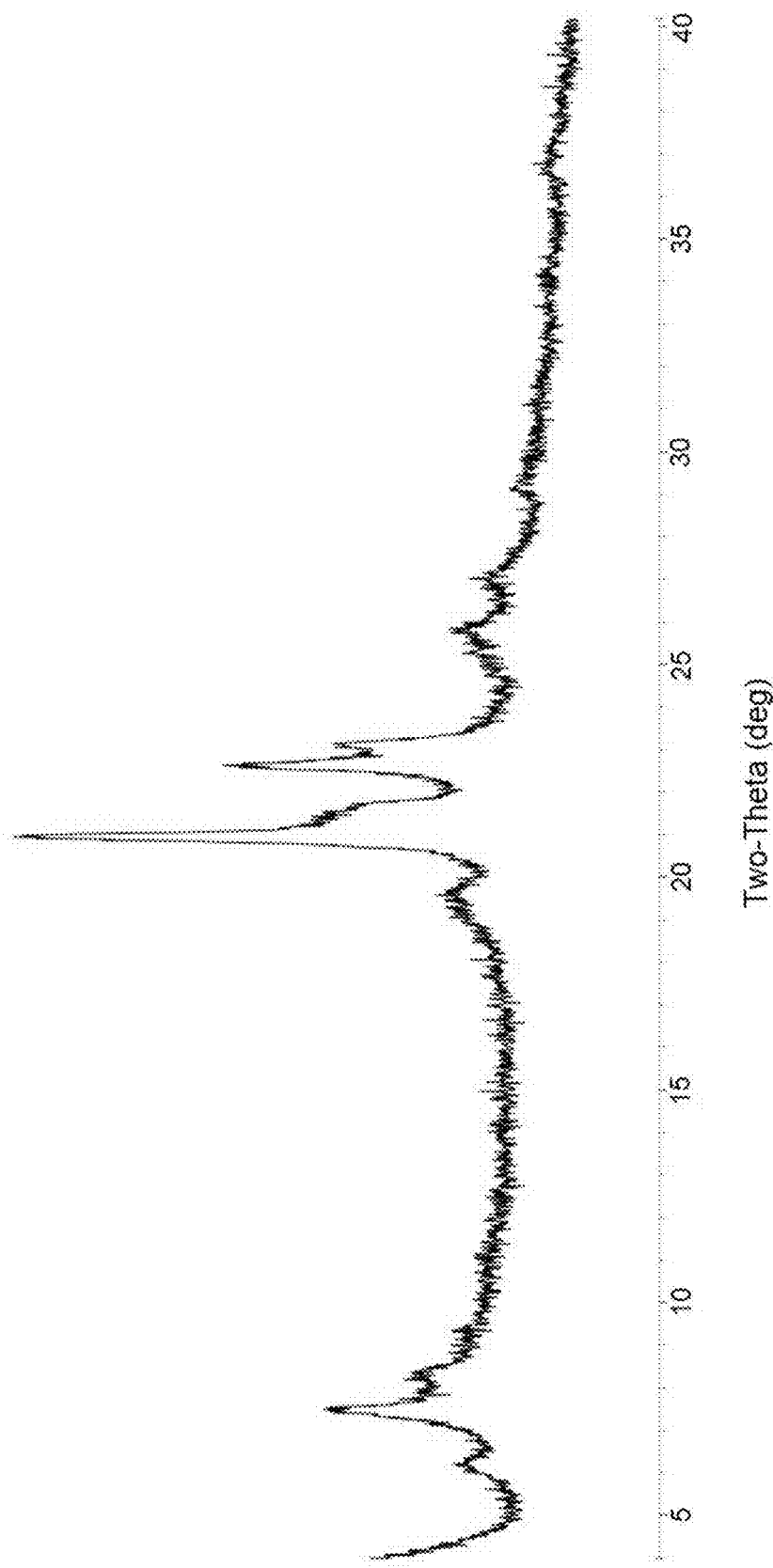
FIG. 1 shows a powder X-ray diffraction (XRD) pattern of the as-synthesized molecular sieve prepared in Example 1.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

Reaction Mixture

In general, a molecular sieve having the framework structure of SSZ-43 may be synthesized by: (a) providing a reaction mixture comprising: (1) a source of silicon oxide; (2) a source of an oxide of a trivalent element (X); (3) a source of a Group 1 or Group 2 metal (M); (4) a structure directing agent (Q) comprising one or more of 3,3'-(butane-1,4-diyl)bis(1-methyl-2-propyl-1H-imidazol-3-ium) dications and N,N'-(1,4-phenylenebis(methylene))bis(N,N-diethylethaniminium) dications; (5) a source of hydroxide ions; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Useful | Exemplary |
| --- | --- | --- |
| $SiO_2/X_2O_3$ | ≥30 | 50 to 200 |
| $M/SiO_2$ | 0.05 to 0.50 | 0.05 to 0.20 |
| $Q/SiO_2$ | 0.05 to 0.50 | 0.10 to 0.30 |
| $OH/SiO_2$ | 0.15 to 0.50 | 0.15 to 0.40 |
| $H_2O/SiO_2$ | 10 to 80 | 15 to 50 | wherein compositional variables X, M and Q are as described herein above.

Suitable sources of silicon oxide include fumed silica, colloidal silica, precipitated silica, alkali metal silicates and tetraalkyl orthosilicates.

Suitable sources of trivalent element X depend on the element X that is selected (e.g., boron, aluminum, gallium, and iron). In embodiments where X is boron, suitable sources of boron include boric acid, sodium tetraborate and potassium tetraborate. Combined sources of silicon and boron can additionally or alternatively be used and can include, for example, borosilicate zeolites (e.g., borosilicate beta zeolite).

In embodiments where X is aluminum, suitable sources of aluminum include hydrated alumina and water-soluble aluminum salts (e.g., aluminum nitrate). Combined sources of silicon and aluminum can additionally or alternatively be used and can include, for example, aluminosilicate zeolites (e.g., zeolite Y) and clays or treated clays (e.g., metakaolin).

Examples of suitable Group 1 or Group 2 metals (M) include sodium, potassium and calcium. The metal is generally present in the reaction mixture as the hydroxide.

The structure directing agent (Q) is selected from one or more of 3,3'-(butane-1,4-diyl)bis(1-methyl-2-propyl-1H-imidazol-3-ium) dications and N,N'-(1,4-phenylenebis (methylene))bis(N,N-diethylethaniminium) dications, represented by the following structures (1) and (2), respectively:

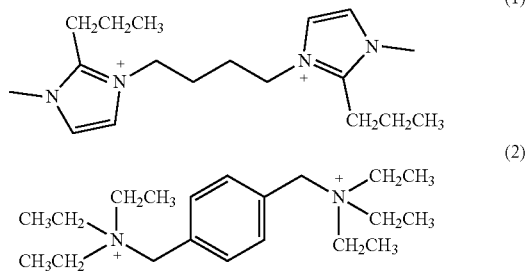

Suitable sources of Q are the hydroxides and/or other salts of the relevant diquaternary ammonium compounds.

The reaction mixture may also contain seeds of a crystalline material, such as SSZ-43 from a previous synthesis, desirably in an amount of from 0.01 to 15,000 ppm by weight (e.g., from 100 to 10,000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-43 over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. for a time sufficient for crystallization to occur at the temperature used, e.g., from about 2 to 21 days. Crystallization is usually carried out in a closed system under autogenous pressure.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pores at least a portion of the structure directing agent used in the synthesis.

The molecular sieve described herein may be subjected to treatment to remove part or all of the structure directing agent (Q) used in its synthesis. This is conveniently effected by thermal treatment in which the as-synthesized material is heated at a temperature of at least about 370° C. for at least 1 minute and generally not longer than 20 hours. The thermal treatment can be performed at a temperature up to 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

To the extent desired, the original Group 1 or 2 metal cations (e.g., Na+) in the as-synthesized molecular sieve can be replaced in accordance with techniques well known in the art by ion exchange with other cations. Preferred replacing cations include metal ions (e.g., rare earth metals and metals of Groups 2 to 15 of the Periodic Table), hydrogen ions, hydrogen precursor ions (e.g., ammonium ions), and combinations thereof.

SSZ-43 can be formulated into a catalyst composition by combination with other materials, such as binders and/or matrix materials, which provide additional hardness or catalytic activity to the finished catalyst. When blended with such components, the relative proportions of SSZ-43 and matrix may vary widely with the SSZ-43 content ranging from 1 to 90 wt. % (e.g., from 2 to 80 wt. %) of the total catalyst.

Characterization of the Molecular Sieve

In its as-synthesized and anhydrous form, the present molecular sieve has a chemical composition comprising the following molar relationship described in Table 2:

TABLE 2

|  | Broad | Exemplary |
| --- | --- | --- |
| $SiO_2/X_2O_3$ | ≥30 | 50 to 200 |
| $Q/SiO_2$ | >0 to 0.1 | >0 to 0.1 |
| $M/SiO_2$ | >0 to 0.1 | >0 to 0.1 | wherein X is a trivalent element (e.g., one or more of boron, aluminum, gallium, and iron); Q comprises one or more of 3,3'-(butane-1,4-diyl)bis(1-methyl-2-propyl-1H-imidazol-3-ium) dications and N,N'-(1,4-phenylenebis(methylene)) bis(N,N-diethylethaniminium) dications; and M is a Group 1 or Group 2 metal.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught by U.S. Pat. No. 5,965,104, molecular sieve SSZ-43 has an X-ray diffraction pattern which, in its as-synthesized form, includes at least the peaks set forth in Table 3 below and which, in its calcined form, includes at least the peaks set forth in Table 4.

TABLE 3

Characteristic Peaks for As-Synthesized SSZ-43

| 2-Theta[a] | d-spacing, nm | Relative Intensity[b] |
|---|---|---|
| 6.2 | 1.42 | W |
| 7.5 | 1.18 | M |
| 7.8 | 1.13 | M |
| 8.1 | 1.09 | M |
| 20.95 | 0.424 | VS |
| 21.5 | 0.413 | S |
| 22.50 | 0.395 | S |
| 23.2 | 0.383 | M |
| 25.6 | 0.348 | M |
| 27.2 | 0.327 | W |

[a]±0.15
[b]The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

TABLE 4

Characteristic Peaks for Calcined SSZ-43

| 2-Theta[a] | d-spacing, nm | Relative Intensity[b] |
|---|---|---|
| 6.2 | 1.42 | M-S |
| 7.5 | 1.18 | W-M |
| 7.8 | 1.13 | W-M |
| 8.1 | 1.09 | W-M |
| 20.95 | 0.424 | VS |
| 21.5 | 0.413 | VS |
| 22.5 | 0.395 | S |
| 23.2 | 0.383 | M |
| 25.6 | 0.348 | W |
| 27.2 | 0.327 | W |

[a]±0.15
[b]The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

9.91 g of deionized water, 0.19 g of a 50% NaOH solution, 21.78 g of a 6.05% N,N'-(1,4-phenylenebis(methylene))bis(N,N-diethylethaniminium) hydroxide solution, and 3.00 g of boron beta zeolite ($SiO_2/B_2O_3$ molar ratio of about 50) were mixed together in a Teflon liner. The resulting gel was stirred until it became homogeneous. The liner was then capped and sealed within a Parr steel autoclave reactor. The autoclave was then placed an oven and heated at 150° C. for 7 days under static conditions. The solid products were recovered from the cooled reactor by centrifugation, washed with deionized water and dried at 95° C.

Figure 2:
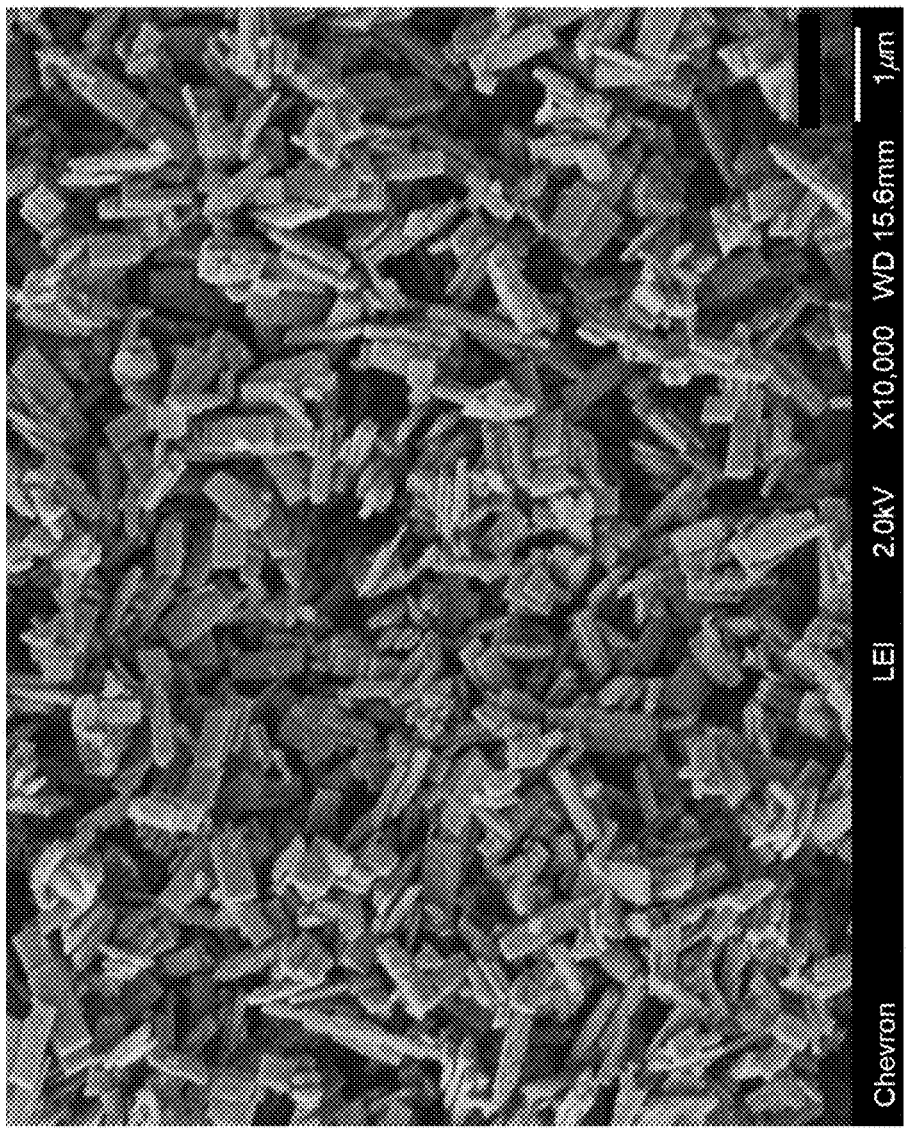
FIG. 2 shows a Scanning Electron Micrograph (SEM) image of the as-synthesized molecular sieve prepared in Example 1.

The resulting product was analyzed by powder XRD and SEM. The powder XRD pattern of the product is shown FIG. 1 and is consistent with the product being SSZ-43. A SEM image of the product is shown in FIG. 2 and indicates a uniform field of crystals.

The product had a $SiO_2/B_2O_3$ molar ratio of 71.5, as determined by ICP elemental analysis.

Example 2

16.41 g of deionized water, 0.50 g of a 50% KOH solution, 36.29 g of a 6.05% N,N'-(1,4-phenylenebis(methylene))bis(N,N-diethylethaniminium) hydroxide solution, 5.00 g of boron beta zeolite ($SiO_2/B_2O_3$ molar ratio of about 50) were mixed together in a Teflon liner. The resulting gel was stirred until it became homogeneous. The liner was then capped and sealed within a Parr steel autoclave reactor. The autoclave was then put in an oven and heated at 150° C. for 7 days under static conditions. The solid products were recovered from the cooled reactor by centrifugation, washed with deionized water and dried at 95° C.

The resulting product was analyzed by powder XRD and SEM and shown to be SSZ-43.

The product had a $SiO_2/B_2O_3$ molar ratio of 73.8, as determined by ICP elemental analysis.

Example 3

31.40 g of deionized water, 0.32 g of a 50% KOH solution, 21.40 g of a 10.19% 3,3'-(butane-1,4-diyl)bis(1-methyl-2-propyl-1H-imidazol-3-ium) hydroxide solution, 5.00 g of boron beta zeolite ($SiO_2/B_2O_3$ molar ratio of about 50) were mixed together in a Teflon liner. The resulting gel was stirred until it became homogeneous. The liner was then capped and sealed within a Parr steel autoclave reactor. The autoclave was then put in an oven and heated at 150° C. for 10 days under static conditions. The solid products were recovered from the cooled reactor by centrifugation, washed with deionized water and dried at 95° C.

The resulting product was analyzed by powder XRD and SEM and shown to be SSZ-43.

The product had a $SiO_2/B_2O_3$ molar ratio of 61.0, as determined by ICP elemental analysis.

Example 4

Example 1 was repeated with the exception that 10 wt. % seed crystals of borosilicate SSZ-43 from a previous synthesis were added to the reaction mixture. The solid products were recovered after 5 days of reaction.

The product was identified by powder XRD and SEM to be a pure SSZ-43 zeolite.

Example 5

Example 3 was repeated with the exception that 10 wt. % seed crystals of borosilicate SSZ-43 from a previous synthesis were added to the reaction mixture. The solid products were recovered after 6 days of reaction.

The product was identified by powder XRD and SEM to be a pure SSZ-43 zeolite.

Example 6

1.87 g of deionized water, 0.08 g of a 50% NaOH solution, 3.32 g of a 10.19% 3,3'-(butane-1,4-diyl)bis(1- methyl-2-propyl-1H-imidazol-3-ium) hydroxide solution, 0.014 g of 50% aluminum hydroxide solution (Barcroft™ 0250 aluminum hydroxide, SPI Pharma) and 2.00 g of LUDOX© AS-30 colloidal silica were mixed together in a Teflon liner. The resulting gel was stirred until it became homogeneous. The liner was then capped and sealed within a Parr steel autoclave reactor. The autoclave was then put in an oven and heated at 170° C. for 11 days with tumbling (43 rpm). The solid products were recovered from the cooled reactor by centrifugation, washed with deionized water and dried at 95° C.

The resulting product was analyzed by powder XRD and SEM and shown to be SSZ-43.

The product had a $SiO_2/Al_2O_3$ molar ratio of 108.9 as determined by ICP elemental analysis.

Example 7

2.53 g of deionized water, 0.11 g of a 50% NaOH solution, 4.47 g of a 10.19% 3,3'-(butane-1,4-diyl)bis(1-methyl-2-propyl-1H-imidazol-3-ium) hydroxide solution, 0.014 g of 50% aluminum hydroxide solution (Barcroft™ 0250 aluminum hydroxide, SPI Pharma) and 3.00 g of LUDOX© AS-30 colloidal silica were mixed together in a Teflon liner. The resulting gel was stirred until it became homogeneous. The liner was then capped and sealed within a Parr steel autoclave reactor. The autoclave was then put in an oven and heated at 170° C. for 11 days with tumbling (43 rpm). The solid products were recovered from the cooled reactor by centrifugation, washed with deionized water and dried at 95° C.

The resulting product was analyzed by powder XRD and SEM and shown to be SSZ-43.

The product had a $SiO_2/Al_2O_3$ molar ratio of 141.6 as determined by ICP elemental analysis.

Example 8

2.81 g of deionized water, 0.12 g of a 50% NaOH solution, 4.98 g of a 10.19% 3,3'-(butane-1,4-diyl)bis(1-methyl-2-propyl-1H-imidazol-3-ium) hydroxide solution, 0.012 g of 50% aluminum hydroxide solution (Barcroft™ 0250 aluminum hydroxide, SPI Pharma) and 3.00 g of LUDOX© AS-30 colloidal silica were mixed together in a Teflon liner. The resulting gel was stirred until it became homogeneous. The liner was then capped and sealed within a Parr steel autoclave reactor. The autoclave was then put in an oven and heated at 170° C. for 10 days with tumbling (43 rpm). The solid products were recovered from the cooled reactor by centrifugation, washed with deionized water and dried at 95° C.

The resulting product was analyzed by powder XRD and SEM and shown to be SSZ-43.

The product had a $SiO_2/Al_2O_3$ molar ratio of 170.3 as determined by ICP elemental analysis.

Example 9

4.69 g of deionized water, 0.20 g of a 50% NaOH solution, 8.29 g of a 10.19% 3,3'-(butane-1,4-diyl)bis(1-methyl-2-propyl-1H-imidazol-3-ium) hydroxide solution, 0.010 g of 50% aluminum hydroxide solution (Barcroft™ 0250 aluminum hydroxide, SPI Pharma) and 5.00 g of LUDOX© AS-30 colloidal silica were mixed together in a Teflon liner. The resulting gel was stirred until it became homogeneous. The liner was then capped and sealed within a Parr steel autoclave reactor. The autoclave was then put in an oven and heated at 170° C. for 10 days with tumbling (43 rpm). The solid products were recovered from the cooled reactor by centrifugation, washed with deionized water and dried at 95° C.

The resulting product was analyzed by powder XRD and SEM and shown to be SSZ-43.

The product had a $SiO_2/Al_2O_3$ molar ratio of 302.7 as determined by ICP elemental analysis.

Example 10

The as-synthesized molecular sieve of Example 1 was calcined inside a muffle furnace under a flow of a mixture of nitrogen and air heated to 540° C. at a rate of 1° C./minute and held at 540° C. for 5 hours, cooled and analyzed by powder XRD.

Figure 3:
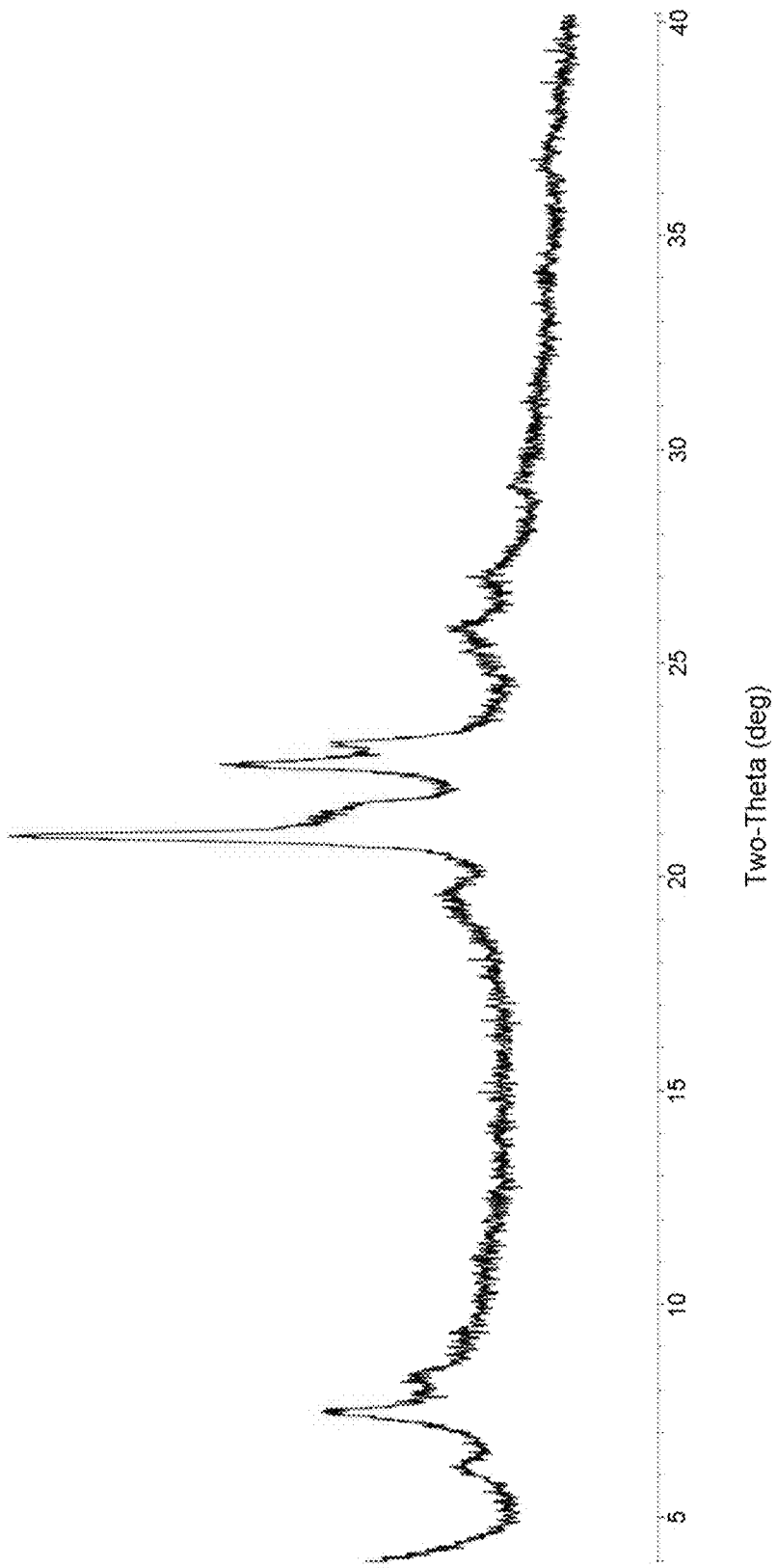
FIG. 3 shows a powder XRD pattern of the calcined molecular sieve prepared in Example 10.

The powder XRD pattern of the calcined molecular sieve is shown in FIG. 3 and indicates that the material remains stable after calcination to remove the organic matter.

Example 11

The calcined material of Example 10 had a micropore volume of 0.13 cm$^3$/g based on argon adsorption isotherm at 87.50 K (−186° C.) recorded on ASAP 2010 equipment from Micromeritics. The sample is first degassed at 400° C. for 16 hours prior to argon adsorption. The low-pressure dose is 2.00 cm$^3$/g (STP). A maximum of one hour equilibration time per dose is used and the total run time is 37 hours. The argon adsorption isotherm is analyzed using the density function theory (DFT) formalism and parameters developed for activated carbon slits by J. P. Olivier (*J. Porous Mater.* 1995, 2, 9-17) using the Saito Foley adaptation of the Horvarth-Kawazoe formalism (*Micropor. Mater.* 1995, 3, 531-542) and the conventional t-plot method (*J. Catal.* 1965, 4, 319-323).

The invention claimed is:

1. A method of synthesizing a molecular sieve having the structure of SSZ-43, the method comprising:
  (a) providing a reaction mixture comprising:
    (1) a source of silicon oxide;
    (2) a source of an oxide of a trivalent element (X);
    (3) a source of a Group 1 or Group 2 metal (M);
    (4) a structure directing agent (Q) comprising one or more of 3,3'-(butane-1,4-diyl)bis(1-methyl-2-propyl-1H-imidazol-3-ium) dications and N,N'-(1,4-phenylenebis(methylene))bis(N,N-diethylethaniminium) dications;
    (5) a source of hydroxide ions; and
    (6) water; and
  (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/X_2O_3$ | ≥30 |
| $M/SiO_2$ | 0.05 to 0.50 |
| $Q/SiO_2$ | 0.05 to 0.50 |
| $OH/SiO_2$ | 0.15 to 0.50 |
| $H_2O/SiO_2$ | 10 to 80. |

3. The method of claim 1, wherein the reaction mixture has a composition, in terms of molar ratios, as follows:

| | |
|---|---|
| SiO$_2$/X$_2$O$_3$ | 50 to 200 |
| M/SiO$_2$ | 0.05 to 0.20 |
| Q/SiO$_2$ | 0.10 to 0.30 |
| OH/SiO$_2$ | 0.15 to 0.40 |
| H$_2$O/SiO$_2$ | 15 to 50. |

4. The method of claim 1, wherein the trivalent element X comprises one or more of boron and aluminum.

5. The method of claim 1, wherein the reaction mixture also contains seeds.

6. The method of claim 5, wherein the reaction mixture comprises from 0.01 to 10,000 ppm by weight of seeds.

7. The method of claim 5, wherein the seeds comprise a crystalline material having the structure of SSZ-43.

8. The method of claim 1, wherein the crystallization conditions include a temperature of from 125° C. to 200° C.

9. A molecular sieve having the structure of SSZ-43 and, in its as-synthesized form, comprising one or more of 3,3'-(butane-1,4-diyl)bis(1-methyl-2-propyl-1H-imidazol-3-ium) dications and N,N'-(1,4-phenylenebis(methylene)) bis(N,N-diethylethaniminium) dications in its pores.

10. The molecular sieve of claim 9, and having a SiO$_2$/X$_2$O$_3$ molar ratio of at least 30, wherein X is a trivalent element.

11. The molecular sieve of claim 10, wherein the SiO$_2$/X$_2$O$_3$ molar ratio is in a range of from 50 to 200.

12. The molecular sieve of claim 10, wherein trivalent element X comprises one or more of boron and aluminum.

* * * * *